United States Patent [19]

Deminski

[11] Patent Number: 4,489,752

[45] Date of Patent: Dec. 25, 1984

[54] GUARD GUIDED MULTIPLE ELEMENT FLOW CONFIGURED POPPET VALVE

[75] Inventor: Richard M. Deminski, Mt. Vernon, Ohio

[73] Assignee: Compressor Valve Services, Inc., Mt. Vernon, Ohio

[21] Appl. No.: 425,559

[22] Filed: Sep. 28, 1982

[51] Int. Cl.³ .............................................. F16K 15/02
[52] U.S. Cl. ............................. 137/512.1; 137/514.3; 137/543.15
[58] Field of Search ................... 137/512.1, 514.3, 536, 137/543.15

[56] References Cited

U.S. PATENT DOCUMENTS

| | | | |
|---|---|---|---|
| 609,726 | 8/1898 | Ball | 137/514.3 |
| 717,029 | 12/1902 | Reynolds | 137/514.3 X |
| 2,809,660 | 10/1957 | Becker | 137/514.3 |
| 3,556,137 | 1/1971 | Billeter | 137/543.15 |
| 3,602,247 | 8/1971 | Bunn | 137/512.1 X |

FOREIGN PATENT DOCUMENTS

| | | | |
|---|---|---|---|
| 1500169 | 5/1969 | Fed. Rep. of Germany | 137/543.15 |
| 2739801 | 3/1979 | Fed. Rep. of Germany | 137/543.15 |

*Primary Examiner*—Robert G. Nilson
*Attorney, Agent, or Firm*—Frost & Jacobs

[57] ABSTRACT

A multi-element poppet valve for use with high pressure gas compressors wherein the over-hang of the poppet element head has been substantially eliminated to strengthen the poppet element. The stem of the poppet element is aerodynamically configured in an outer convex wall surface which flares smoothly outwardly from the bottom of the stem to the beginning of the head portion. The head portion has a bell-shaped top which flares outwardly in a concave surface to the edge of the poppet element. The poppet element is restrained for reciprocating movement by a guide insert fixed to the bottom of the guard bore cavity which telescopically receives the poppet element stem. Elimination of the over-hanging poppet head minimizes turbulence and reduces the possibility of breakage under high differential pressure conditions.

1 Claim, 4 Drawing Figures

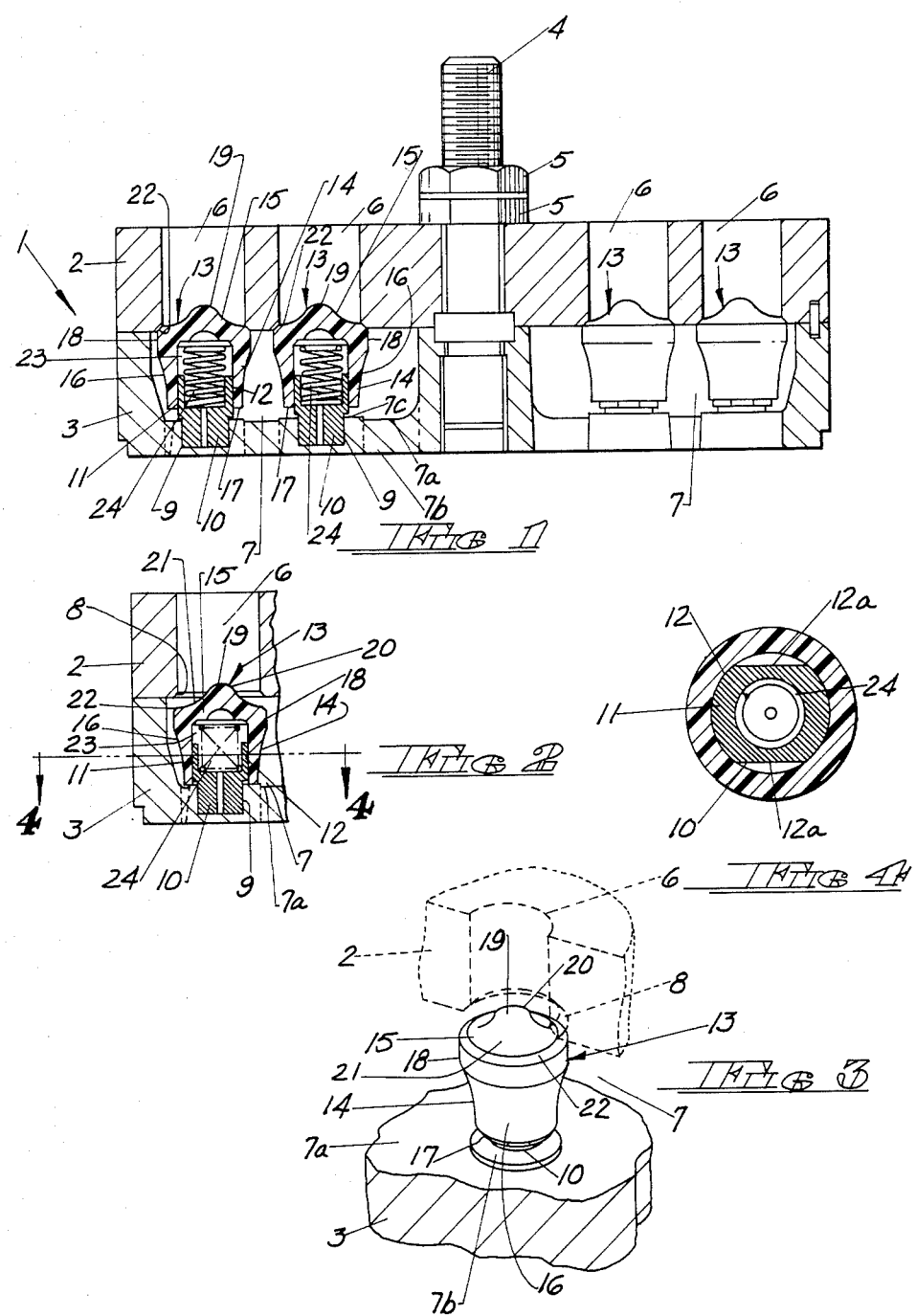

GUARD GUIDED MULTIPLE ELEMENT FLOW CONFIGURED POPPET VALVE

SUMMARY OF THE INVENTION

The present invention is directed to a multiple element poppet valve arrangement, particularly for use with high pressure gas compressors, and more specifically to a valve in which the poppet elements are guided in the guard and are provided with flow configured heads.

The use of single or multiple deck multi element poppet valves in high pressure gas transmission compressors and the like is well known. In conventional installations, the poppet valve is formed by a plate-like seat member having a number of spaced bores communicating with an inlet port which mates with a plate-like guard member, having an annular recess which communicates with an outlet port. The bores and recesses are so arranged that they will be axially aligned to form a valve chamber when the guard and seat, respectively, are mated together, with the periphery of the seat bore adjoining the guard bore forming a seating surface.

A poppet element is reciprocable within each valve chamber. Conventionally, the poppet is mushroom-shaped and includes a hollow stem slidable within a counter recess in the guard bore which serves to guide the poppet during its reciprocating travel. The opposite end of the poppet element is of a convex arcuate shape configured to form a fluid tight seal with the valve seat when the valve is closed. A coil spring located within the hollow valve stem serves to bias the poppet element toward the seat.

Although such poppet valve designs have been in wide-spread use for a long period of time, they have not been completely without problems. In instances where the poppet element is exposed to a high differential pressure, the stress forces induced in the poppet element head may cause fracture or disintegration of the poppet element. It is believed that this failure can be directly related to the length that the head overhangs the stem. Prior attempts to increase the stem diameter and/or to reduce the over-hung length have resulted in a decrease of flow area through the valve guard portion of the valve assembly. Furthermore, the aerodynamic geometry of the poppet element may be adversely affected.

The present invention is directed to a poppet element and valve design which addresses the above noted problems of prior art designs. In the present invention, the poppet element stem no longer reciprocates in a counterbore provided in the guard recess, but rather is mounted with a sliding fit on a hollow guide insert longitudinally disposed within valve chamber. In the embodiment illustrated, the poppet element stem is hollow and dimensioned to slidingly receive the cylindrical hollow guide insert. A compression spring positioned within the hollow guide insert serves to bias the poppet element toward the seat.

To overcome the problems previously encountered with stresses induced in the poppet element head over-hang area, the shape of the poppet element of the present invention has been substantially and advantageously modified. The improved poppet element is of generally cylindrical shape and includes an integrally formed stem portion surmounted by a head portion. The stem portion is defined by an outer convex wall which flares smoothly outwardly from the substantially flat round bottom of the poppet element. The bottom of the poppet element is designed to contact the bottom of the guard to form a stop when the poppet element is in the fully opened position.

The head of the poppet element is defined by a cylindrical sidewall portion which continues smoothly from the stem portion and a substantially convex bell-shaped top which is formed by a rounded bulbous central area which flares in a concave-shaped surface outwardly to the edge of the poppet element defined by the sidewall. The transition region between the sidewall and the top forms a surface which is configured to mate with the seating surface to form a fluid tight seal. This arrangement eliminates the over-hang found with conventional poppet elements while maintaining an aerodynamic efficient profile.

Further features of the invention will become apparent from the detailed description which follows:

BRIEF DESCRIPTION OF THE DRAWING

FIG. 1 is a fragmentary partially cross sectioned side elevation view of a single deck multiple element poppet valve incorporating the improved features of the present invention.

FIG. 2 is an enlarged fragmentary cross sectional view of a single poppet element in the fully opened position.

FIG. 3 is an enlarged front perspective view of a poppet element of the present invention.

FIG. 4 is an enlarged cross sectional view taken along section line 4—4 of FIG. 2.

DETAILED DESCRIPTION

The poppet valve of the present invention is illustrated generally at 1 in FIG. 1. Although for purposes of an exemplary showing, the poppet valve 1 has been described and illustrated as comprising a single deck, it would be understood that the same inventive principles may be extended to provide multiple deck constructions.

Valve 1 is formed from a generally circular upper plate-like seat member 2 which is mated to a generally circular lower plate-like guard member 3. Seat member 2 and guard member 3 are held securely together by a threaded stud 4 and associated nuts 5 as is well known in the art.

Seat member 2 is provided with a plurality of through bores 6 spaced at equal distances from threaded mounting stud 4. It will be understood that each of bores 6 is configured to connect with a common passageway communicating with an inlet port (not shown) through which may be passed inlet gas.

Guard member 3 is provided with an annular counterbore or chamber 7 which is generally axially aligned with stud 4. Chamber 7 also communicates with an outlet port, not shown. While it will be understood that valve 1 may be constructed as a discharge or suction valve, in the specific embodiment illustrated in FIG. 1, all valve elements have been arranged to operate as a suction valve.

As best seen in FIG. 2, the periphery of seat bore 6 adjoining chamber 7 is chamfered as at 8 to form a seating surface which cooperates with the poppet element to form a fluid tight seal as will be described in more detail hereinafter.

It will be observed that annular-shaped chamber 7 is defined on the upper end by seat 2 containing bores 6, on the outer diameter by a circumferential wall, on the inner diameter by the hub at the center of chamber 7 and on the bottom by the combination of flow paths 7a, and bores 9 mounting inserts 10. It will be understood that flow paths 7a through the guard are defined by spaced ribs 7b, one of which is shown in cross section in FIG. 1.

A counterbore 9 of generally circular shape is provided in the bottom surface 7c of annular bore or chamber 7 in guard 3. It will be observed that the surface 7a is slightly raised as at 7c immediately surrounding each bore 9. A hollow guide insert, illustrated generally at 10, is press fitted into each of these counterbores 9. The lower portion of each guide insert 10 is generally cylindrical and of a slightly larger diameter than the corresponding inside diameter of counter bore 9 so as to form a tight press fit therein. The upper portion of each guide insert 10 forms a generally thin walled cylindrical shell 11, and includes a generally smooth outer cylindrical surface 12 bearing a pair of vertically extending diametrically opposed flats 12a. Each guide insert 10 is installed longitudinally within chamber 7 so that the hollow portion of shell 11 faces and is axially aligned with the adjacent through bore 6 in seat 2.

Each guide insert 10 is provided with a poppet element, shown generally at 13, which is reciprocable within valve chamber 7. Each poppet element 13 is of generally cylindrical design and includes an integrally formed stem portion 14 surmounted by a head portion 15. Stem portion 14 is defined by an outer convex wall 16 which flares smoothly outwardly from a substantially flat round bottom 17, as best shown in FIG. 3. The actual shape of wall 16 will be chosen to impart an efficient aerodynamic profile to the outer surface of stem portion 14 of the poppet element.

The poppet element head portion 15 is defined by a cylindrical sidewall portion 18 which continues smoothly from the stem portion 14 to a substantially convex bell-shaped top 19. The outer surface of sidewall portion 18 is substantially parallel to the longitudinal axis of the poppet element. The top of the poppet element is formed by a rounded bulbous centrally located protrusion 20 which flares outwardly forming a concave surface 21 to the edge of the poppet element defined by sidewall 18. As best shown in FIG. 2 and FIG. 3, the transition between sidewall portion 18 and the bell-shaped top 19 forms a surface 22 configured to mate with chamfer 8 to form the seating surface of the seat to form a fluid tight seal when the poppet element is in the closed position as illustrated in FIG. 1.

The interior of stem portion 14 is hollow as at 23 and is provided with a compression spring 24 which acts to urge the poppet element away from guide insert 10 toward seat member 2.

In operation, poppet element 13 normally assumes the position shown in FIG. 1. Under conditions of a pressure differential between the bore 6 and chamber 7, the poppet element will assume the fully opened position shown in FIG. 2. It will be observed that when fully opened, the flat bottom 17 of the poppet element comes into contact with the flat bottom of the raised portion 7c of the lower surface of chamber 7, thereby providing a stop for the poppet element and control of the opening clearance of the valve. When the differential pressure is released, the poppet element returns to the position shown in FIG. 1.

It will be observed that the cooperation between guide insert 10 and the poppet element 13 maintains the poppet element in proper relationship to the valve seat.

The flats 12a on the outer surface of the insert operate to control the dashpot action between the insert and the poppet base. However, it will be understood that the flats may be eliminated, if desired, to create a smooth outer surface. Furthermore, because the diameter of the guide insert is larger than the normal stem portion of conventional mushroom-shaped poppets, better guidance of the poppet element is obtained. By guiding the poppet element on the inside diameter, the over-hanging head feature associated with conventional mushroom-shaped poppet elements is eliminated. This increases the section modulus of the poppet element of the present invention without substantially increasing its total weight. Additionally, since the thinner portion of the poppet element is smaller in area than the over-hanging portion of a conventional mushroom-shaped poppet element, less load is applied to the thin section of the present poppet element. The elimination of the over-hanging poppet head also minimizes the existence of turbulence within the valve assembly, thereby increasing efficiency. Since a lesser total area of thin section is exposed to the differential pressures which exists within the valve chamber, stresses within the valve poppet are also sharply reduced.

It will be understood that various changes in the details, steps, materials and arrangements of parts, which have been herein described and illustrated in order to explain the nature of the invention, may be made by those skilled in the art within the principle and scope of the invention as expressed in the appended claims. For example, while the present invention has been described and illustrated in connection with a natural gas transmission compressor, it will be understood it also has application to air and other gas compressors.

The embodiments of the invention in which an exclusive property or privilege is claimed are in follows:

1. A poppet valve assembly for use in high pressure gas compressors and the like comprising a plate-like seat member having a mating surface and a plurality of spaced seat bores extending axially therethrough; a plate-like guard member having a mating surface including an annular guard bore therein configured to communicate with an outlet port, said seat member and said guard member being mated together so that said mating surfaces abut each other, said seat bores communicating with said guard bore to form a valve chamber, the peripheral opening of each seat bore adjacent said guard bore being configured to form a seating surface; a poppet element reciprocable within said valve chamber of generally cylindrical design and including an integrally formed stem portion surmounted by a head portion, said stem portion being defined by an outer convex wall surface flaring smoothly outwardly from the bottom of the stem to the beginning of the head portion, said head portion forming a fluid tight seal with said seating surface when the poppet element is in the closed position to prevent flow between the guard and seat, the bottom edge of the stem contacting the bottom surface of said guard bore to serve as a stop when the poppet element is in the fully opened position to control the opening clearance between the head and seating surface, said head portion being defined by a side wall portion adjoining said stem portion and a bell-shaped top formed by a rounded bulbous central portion flaring outwardly in a substantially concave surface to said side wall portion such that no part of the head portion overhangs the stem portion, the transition between said side wall portion and said top forming a surface configured to form a fluid tight seal with said seating surface, said side wall being of cylindrical shape and having an outer surface substantially parallel to the longitudinal axis of the poppet element, said stem portion including a hollow cavity therewithin and spring means within said cavity for urging said poppet element to the closed position; and means for restraining said poppet element for sliding reciprocating movement within said valve chamber, said guide insert being telescopically received within said poppet element cavity to guide and restrain the element during reciprocating movement, said guide insert being at least partially hollow to form an interior cavity, said spring means being disposed within the respective interior cavities of the poppet element and guide insert, respectively.

* * * * *